(12) United States Patent
Xu et al.

(10) Patent No.: US 8,798,200 B2
(45) Date of Patent: Aug. 5, 2014

(54) CONSTELLATION MAPPING METHOD

(75) Inventors: Jin Xu, Guangdong (CN); Jun Xu, Guangdong (CN); Zhifeng Yuan, Guangdong (CN); Qianzi Xu, Guangdong (CN); Xianwei Gong, Guangdong (CN); Bo Sun, Guangdong (CN); Huiying Fang, Guangdong (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 259 days.

(21) Appl. No.: 13/202,929

(22) PCT Filed: Jul. 3, 2009

(86) PCT No.: PCT/CN2009/072621
§ 371 (c)(1),
(2), (4) Date: Aug. 23, 2011

(87) PCT Pub. No.: WO2010/118589
PCT Pub. Date: Oct. 21, 2010

(65) Prior Publication Data
US 2012/0020435 A1    Jan. 26, 2012

(30) Foreign Application Priority Data

Apr. 14, 2009  (CN) .......................... 2009 1 0132796

(51) Int. Cl.
*H04L 27/36* (2006.01)
*H04L 1/00* (2006.01)
*H04L 27/34* (2006.01)
*H04L 1/18* (2006.01)

(52) U.S. Cl.
CPC .......... *H04L 27/3405* (2013.01); *H04L 1/0071* (2013.01); *H04L 1/0066* (2013.01); *H04L 1/1893* (2013.01)
USPC ............ 375/298; 375/261; 375/295; 741/792

(58) Field of Classification Search
CPC ..... H04L 27/34; H04L 27/362; H04L 1/0003; H04L 1/0071; H04L 27/38; H03M 13/256
USPC .......................... 375/298, 295, 261; 714/792
See application file for complete search history.

(56) References Cited

U.S. PATENT DOCUMENTS

2008/0187072 A1 * 8/2008 Schell et al. ................. 375/296
2008/0192851 A1   8/2008 Golitschek Edler Elbwart et al.
(Continued)

FOREIGN PATENT DOCUMENTS

| CN | 101119182 A | 2/2008 |
|---|---|---|
| CN | 101183919 A | 5/2008 |

(Continued)

OTHER PUBLICATIONS

PCT/CN2009/072621 International Search Report (ISR) mailed Jan. 21, 2010, 4 pgs.

(Continued)

*Primary Examiner* — Ted Wang
(74) *Attorney, Agent, or Firm* — PatentVentures; Bennett Smith; Korbin Van Dyke

(57) ABSTRACT

The present invention provides a constellation mapping method, and the method includes: flipping a plurality of bits in each modulation symbol unit to be mapped in part of or all of modulation symbol units to be mapped of a bit sequence to be mapped; and mapping each flipped modulation symbol unit to be mapped as a modulation symbol in a constellation. By means of the present invention, the phenomenon that consecutive bits have the same reliability can be effectively avoided by changing unevenness of reliability distribution of the consecutive bits, and at the same time, the link performance can be improved.

6 Claims, 9 Drawing Sheets

(56) References Cited

U.S. PATENT DOCUMENTS

2008/0267316 A1* 10/2008 Golitschek Edler Von Elbwart et al. ............................ 375/298
2009/0063924 A1* 3/2009 Golitschek Edler Von Elbwart et al. ............................ 714/748

FOREIGN PATENT DOCUMENTS

| CN | 101299746 A | 11/2008 |
|---|---|---|
| EP | 1253759 A1 | 10/2002 |
| EP | 1667391 A1 | 6/2006 |
| WO | 2008078113 A1 | 7/2008 |

OTHER PUBLICATIONS

PCT/CN2009/072621 Written Opinion (WO) mailed Jan. 21, 2010, 5 pgs.

G Yue and X Wang, Proposed Text on Constellation Rearrangement and Bit Grouping for IEEE 802.16mAmendment, IEEE 802.16 Broadband Wireless Access Working Group, Apr. 27, 2009, 7 pgs.

Xianwei Gong, Bo Sun, A new Bit-Rearrangement scheme for channel coding, IEEE 802.16 Broadband Wireless Access Working Group, Jan. 7, 2009, 8 pgs.

Lei Huang. "Proposed Text on Constellation Re-arrangement for IEEE 802.16m Amendment", IEEE 802.16 Broadband Wireless Access Working Group, Mar. 9, 2009, 4 pgs (including 1 archive listing and 1 cover pages).

Changlong Xu, Rui Huang, Tom Harel, Yang-seok Choi, Hujun Yin, "Proposed for 802.16m amendment text on Constellation Rearrangement", IEEE 802.16 Broadband Wireless Access Working Group, Mar. 2, 2009, 6 pgs (including 1 archive listing and 1 cover pages).

Chien-Yu Kao, Jen-Yuan Hsu, Yu-Tao Hsieh, Pang-An Ting, Richard Li, "New bit-rearrangement method to enhance HARQ performance", IEEE 802.16 Broadband Wireless Access Working Group, IEEE C802.16M-8/1144, IEEE-SA, Piscataway, NJ USA, vol. 802.16m, Sep. 5, 2008, 11 pgs (including 1 cover page).

Siemens, "Proposal for Constellation Rearrangement for 64-QAM", 3GPP TSG RAN WG1 Meeting #47bis, vol. R1-070313, No. 47, Jan. 15, 2007, 3 pgs.

Panasonic: "Enhanced HARQ Method with Signal Constellation Rearrangement", TSG-RAN Working Group 1 Meeting #19; TSGR1#19(01)0237; RI-01-0237, 3rd Generation Partnership Project (3GPP), Mobile Competence Centre ; 650, Route Des Lucioles ; F-06921 Sophia-Antipolis Cedex; France, vol. RAN WG1, No. Las Vegas; Feb. 23, 2001, 11 pgs.

European Patent Office, "The extended European Search Report", Dec. 2, 2013, re Application No. EP 09 84 3223; 11 pgs (including 1 cover page).

* cited by examiner

CONSTELLATION MAPPING METHOD

FILED OF THE INVENTION

The present invention relates to the communication field, in particular to a constellation mapping method.

BACKGROUND OF THE INVENTION

FIG. 1 shows the structure of a digital communication system. As shown in FIG. 1, the digital communication system consists of a transmitter, a channel and a receiver, wherein the transmitter typically includes a source, a source encoder, a channel encoder, a modulator etc., the receiver usually includes a demodulator, a channel decoder, a source decoder, a destination etc., and during the communication process between the transmitter and the receiver, the transmitter transmits data to the receiver through the channel in which a noise source usually exists.

In the digital communication system, a channel coding link (including channel encoding and decoding, modulation and demodulation, etc.) is a key part of the whole digital communication physical layer, and the processing of the channel coding link determines the effectiveness and reliability of a bottom layer transmission in the digital communication system.

FIG. 2 shows a flowchart of information block bit data passing through the channel coding link to output modulation symbols. As shown in FIG. 2, the channel coding link mainly includes several parts of processing as follows.

Channel Coding (CC for Short)

The channel coding enables the system to have the ability of automatically correcting errors by artificially adding redundant information, to combat various kinds of noises and interferences in the transmission process, so as to ensure the reliability of the digital transmission. For example, a Convolutional Turbo code is acknowledged as one of excellent forward error correction (forward-acting error correction) codes, and is widely used in many standard protocols as a channel coding solution of data service transmission.

Rate Matching (RM for Short)

The rate matching processing is a key technique for the follow-up operations of the channel coding, and aims to repeat or puncture the code word bits after the channel coding, wherein the repeating or puncturing operation may be controlled by an algorithm, to ensure that the data bit length after the rate matching matches the allocated physical channel resources.

At present, there are two kinds of rate matching algorithms: 3GPP R6 rate matching algorithm and Circular Buffer Rate Matching (CBRM for short) algorithm, wherein as the Circular Buffer Rate Matching algorithm is capable of generating a simple algorithm with excellent performance of punctured patterns, the Circular Buffer Rate Matching algorithm is used in the 3GPP2 standard series, the IEEE802.16 standard and the 3GPP LTE standard for rate matching.

Hybrid Automatic Repeat Request (HARQ for Short)

The HARQ is an extremely important link adaptive technology in the digital communication system. The implementation process of the technology is: the receiver decoding the received HARQ data packet, if the decoding is correct, returning an ACKnowledge character (ACK for short) to the transmitter to inform the transmitter of transmitting a new HARQ data packet; if the decoding fails, returning a Negative ACKnowledge character (NACK for short) signal to the transmitter to request the transmitter to retransmit the HARQ data packet again. The receiver can improve success probability of decoding and meet the requirement of high reliability in the link transmission, by performing IR or Chase combination decoding on the data packets retransmitted for multiple times.

HARQ Subpacket Identifier (SPID for Short)

The SPID is currently used in the IEEE802.16 standard for determining the specific location of the subpacket data in a circular buffer region.

In an IEEE802.16 system, the HARQ subpacket identifier and an HARQ data packet length collectively define a starting position and length of the HARQ subpacket data in the circular buffer region, so that a section of code words may be selected from the circular buffer region to generate the current HARQ subpacket, wherein the value range of the SPID is {00, 01, 10, 11}, which occupies 2 bits in a control signaling. The SPID value transmitted for the first time must be 00, and the SPID value in a retransmission can be arbitrarily selected or selected in a certain order in the range. That is, in multiple transmissions, a certain SPID value may be repeatedly used, or a certain SPID value may not be used. In particular, when the code rates for the multiple transmissions are the same, and the SPID values are in sequence of 00, 01, 10, 11, the locations of the transmitted subpackets in a mother code are consecutive in turn.

HARQ Subpacket Generation Process

In the IEEE802.16 standard, the HARQ subpacket data are generated by using a method of Circular Buffer Rate Matching (CBRM for short) processing flow, and the method specifically includes the processes as follows.

Assume that there is an information block bit data sequence I ($i_0$, $i_1$, L, $i_{K-1}$) wherein K is the length of the information block bit data, $i_k$ ($0 \leq k \leq K-1$) is binary bit data, the information block bit data I is performed with a CTC encoding, and the output CTC encoded code word bit stream sequence is C ($c_0$, $c_1$, L $c_{3 \times K-1}$), assuming that the code rate of the mother code of the CTC encoding is 1/3 (here the code rate of the mother code of the CTC encoding of 1/3 is just an example, other code rates may also be used).

Then, a bit separation operation is performed on the output CTC encoded code word bit stream sequence C to obtain a systematic bit stream (or system bit stream, also referred to as systematic bits) sequence S ($s_0$, $s_1$, L $s_{K-1}$), a first parity bit stream (or first parity bits) sequence P1 ($p_0^1$, $p_1^1$, L $p_{K-1}^1$) and a second parity bit stream (or second parity bits) sequence P2 ($p_0^2$, $p_1^2$, L $p_{K-1}^2$).

Then, a sub-block interleaving is performed on the separated systematic bit stream sequence S, the first parity bit stream sequence P1 and the second parity bit stream sequence P2 respectively, to obtain a sub-block interleaved systematic bit stream sequence SI ($s_0^I$, $s_1^I$, L, $s_{K-1}^I$), a sub-block interleaved first parity bit stream sequence P1I ($p1_0^I$, $p1_1^I$, L, $p1_{K-1}^I$), and a sub-block interleaved second parity bit stream sequence P2I ($p2_0^I$, $p2_1^I$, L, $p2_{K-1}^I$).

Bit interleaving is performed on the first parity bit stream sequence P1I after sub-block interleaving processing and the second parity bit stream sequence P2I after sub-block interleaving processing, to form a check bit sequence (parity bit sequence) P($p_0^I$, $p_1^I$, L, $p_{2K-1}^I$), wherein the check bit sequence P and the first parity bit stream sequence P1I after sub-block interleaving processing, the second parity bit stream sequence P2I after sub-block interleaving processing respectively satisfy the following relation:

$p_{2k}^I = p1_k^I (0 \leq k \leq K-1)$, and $p_{2k+1}^I = p2_k^I (0 \leq k \leq K-1)$.

In the above, a virtual circular buffer CB ($cb_0$, $cb_1$, L, $cb_{3 \times K-1}$) is formed according to the sequence that the sub-block interleaved systematic bit stream SI precedes the check bit sequence P, and the virtual circular buffer CB and the systematic bit stream SI after sub-block interleaving processing, the check bit sequence P respectively satisfy the following relation:

$$cb_k = s_k^I k=0,1,L\ K-1, \text{ and}$$

$$cb_{K-k} = p_k^I k=0,1,L\ 2K-1.$$

In the IEEE802.16 protocol, a starting position from which the HARQ data is read in the virtual circular buffer is determined according to the subpacket identifier (SPID for short), and the specific formula is pos(SPID)=(L*SPID) mod(3*K), wherein, L is the length of the transmitted HARQ data packet.

Bit data D=($d_0, d_1 L, d_{L-1}$) of the transmitted HARQ packet with the size of L is circularly read from the starting position pos(SPID) in the virtual circular buffer.

High Order Modulation

In order to achieve higher frequency spectrum utilization, in a large number of communication standard protocols, it is more and more inclined to use a high order modulation method to improve the frequency spectrum utilization and peak value transmission rate performance of the system, wherein the most commonly used high order modulation methods include 16 QAM, 64 QAM and so on. In these high order modulation methods, constellation point mapping bits often have different levels of reliability, that is, in a single modulation symbol, two bits therein have higher bit error probability than another two bits in the modulation symbol. Therefore, how to use the different reliabilities of the constellation point mapping bits to improve decoding and transmission performance is a problem to be solved currently.

FIG. 3 shows a constellation with a modulation method of 16 QAM in the IEEE802.16 system. As shown in FIG. 3, the reliability of bits b1, b3 is higher than that of bits b0, b2, so b1, b3 are referred to as high priority bits, and b0, b2 are referred to as low priority bits. The constellation arrangement of 64 QAM in the IEEE802.16 is as shown in FIG. 4, wherein bits b2, b5 have the highest reliability, followed by bits b1, b4, and bits b0, b3 have the poorest reliability, so bits b2, b5 are referred to as high priority bits, bits b1, b4 are referred to as medium priority bits, and bits b0, b3 are referred to as low priority bits.

Constellation Re-Arrangement (CoRe for Short)

The CoRe is a technology related to the high order modulation, the CoRe balances frequency spectrum energy of each code word bit during consecutive HARQ subpacket retransmission by changing a bit mapping rule within a symbol, so as to average the reliabilities of the code word bits, enhance link performance, and improve system reliability.

Constellation Re-Arrangement Version (CRV for Short)

Constellation re-arrangement version is a concept related to the constellation re-arrangement technology, and is used to indicate constellation mapping rules. One CRV is one kind of the mapping method from a bit sequence to a constellation point.

In the current IEEE 802.16 protocol, bit grouping only includes a bit interleaving operation on a parity bit stream. This method of bit grouping will cause some consecutive bits to have the same reliability level, when there are interferences and noises in a channel, continuous burst errors may occur, which decreases the link performance.

As to the problem in the related art that the link performance decreases as bit grouping makes bits having the same reliability level consecutively distributed, no effective solution has been provided yet at present.

SUMMARY OF THE INVENTION

The present invention is provided in view of the problem that the link performance decreases as bit grouping makes bits having the same reliability level consecutively distributed. Thus, the present invention mainly aims to provide a constellation mapping solution.

According to one aspect of the present invention, a constellation mapping method is provided.

The constellation mapping method according to the present invention comprises: flipping a plurality of bits in each modulation symbol unit to be mapped in part of or all of modulation symbol units to be mapped of a bit sequence to be mapped; and mapping each flipped modulation symbol unit to be mapped as a modulation symbol in a constellation.

According to another aspect of the present invention, a constellation mapping method is provided.

The constellation mapping method according to the present invention comprises: determining a constellation interleaving method for each modulation symbol unit to be mapped in part of or all of modulation symbol units to be mapped of a bit sequence to be mapped according to a re-arrangement version, a cyclic shift amount, and a modulation order of the modulation symbol unit to be mapped; and interleaving, according to the determined constellation interleaving method, the bits in a corresponding modulation symbol unit to be mapped, and mapping the modulation symbol unit to be mapped as a modulation symbol in a constellation.

According to a further aspect of the present invention, a constellation mapping method is provided.

The constellation mapping method according to the present invention comprises: determining a cyclic shift amount for each modulation symbol unit to be mapped in part of or all of modulation symbol units to be mapped of a bit sequence to be mapped according to an index of the modulation symbol unit to be mapped; and performing cyclic shifting, according to the determined cyclic shift amount and a predetermined bit interleaving rule, on a corresponding modulation symbol unit to be mapped, and mapping the modulation symbol unit to be mapped as a modulation symbol in a constellation.

By means of the above technical solution of the present invention, the phenomenon that consecutive bits have the same reliability can be effectively avoided by changing the unevenness of reliability distribution of the consecutive bits; meanwhile, through a closed-form analytical method, there is a uniform processing for different modulation methods and different constellation re-arrangement versions, which could make the processing procedure simple and complete; further, through the cyclic shift operations within a symbol, the purpose of optimizing the bit grouping can be achieved, the function of the constellation re-arrangement can be realized, and moreover, the link performance can be improved.

BRIEF DESCRIPTION OF THE ACCOMPANYING DRAWINGS

The drawings herein are used to provide further understanding of the present invention and form a part of the application. The exemplary embodiments and the description thereof are used to explain the present invention without unduly limiting the scope of the present invention, wherein.

DETAILED DESCRIPTION OF THE EMBODIMENTS

Brief Description of Functions

In view of the problem that the link performance decreases as bit grouping makes bits with the same reliability level consecutively distributed, the embodiments of the present invention achieves interleaving of constellation bits by flipping and/or shifting bits in a symbol unit to be mapped and by disarranging the order of multiple consecutive bits with the same reliability, such that the bits with high reliability are evenly distributed, so as to improve the overall performance of the link. The technical solutions of the embodiments of the present invention are described in detail as follows. The embodiments of the present invention and the features of the embodiments can be combined with each other if there is no conflict.

Method Embodiment 1

In the present embodiment, a constellation mapping method is provided.

Figure 1:
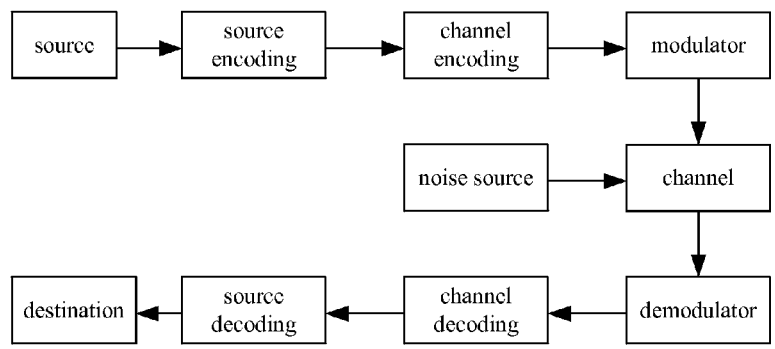
FIG. 1 is a block diagram of the digital communication system according to the related art.
Figure 2:
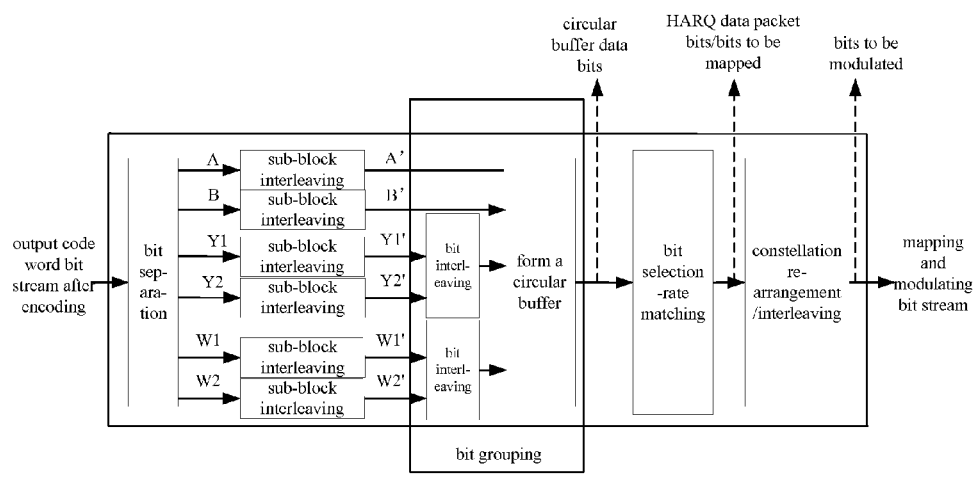
FIG. 2 is a schematic diagram of the realization of the rate matching according to the related art.
Figure 3:
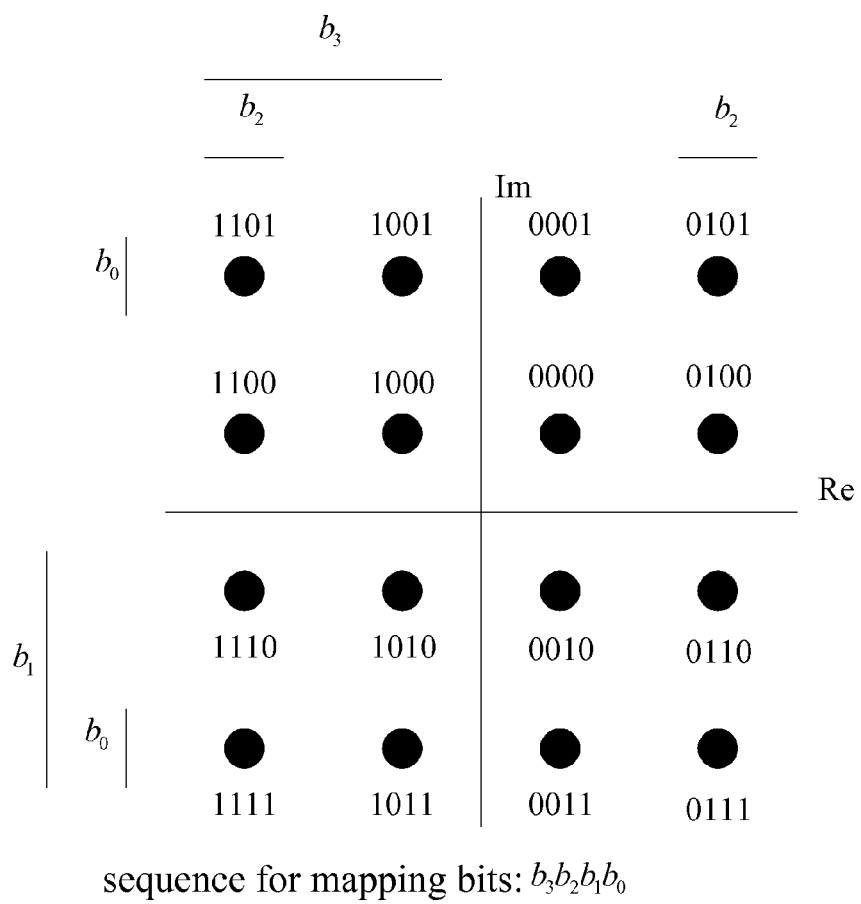
FIG. 3 is a bit mapping constellation with a 16 QAM modulation in the IEEE802.16 standard in the related art.
Figure 4:
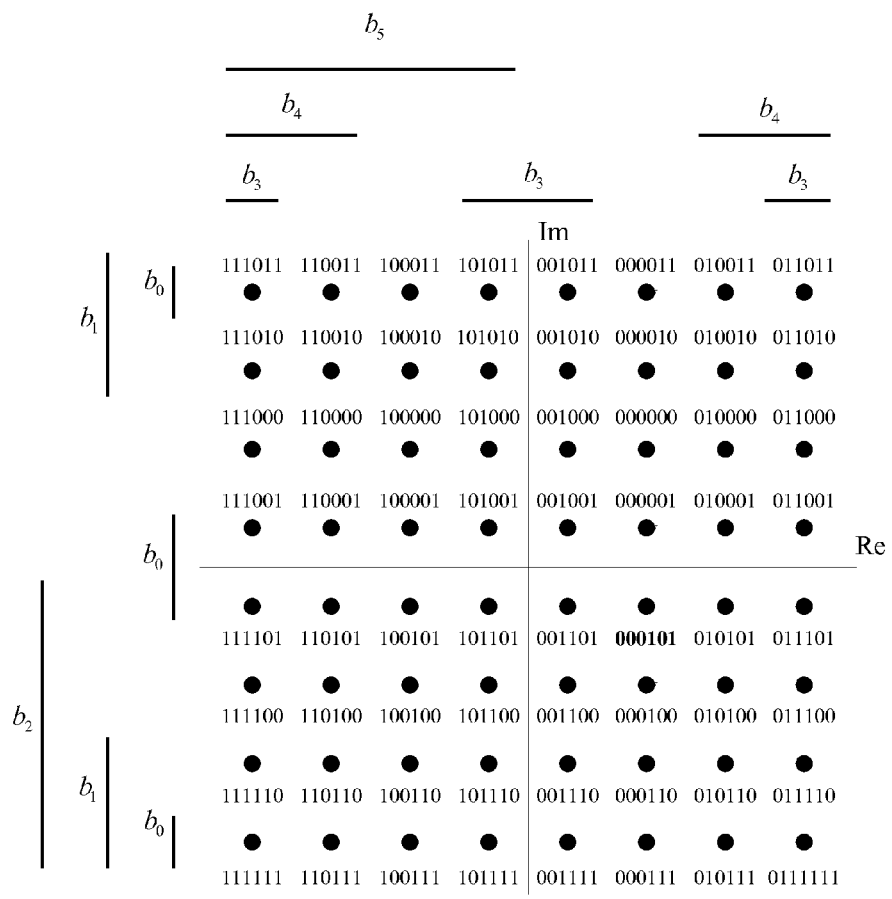
FIG. 4 is a bit mapping constellation with a 64 QAM modulation in the IEEE802.16 standard in the related art.
Figure 5:
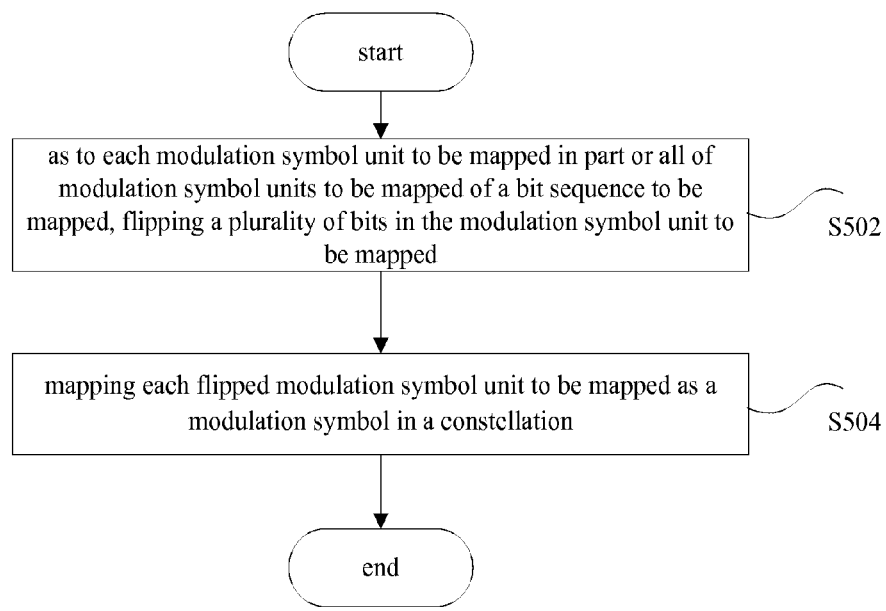
FIG. 5 is a flowchart of the constellation mapping method according to method embodiment 1 of the present invention.

FIG. 5 is a flowchart of the constellation mapping method according to the present embodiment. It shall be explained that steps described in the following method may be carried out in, for example, a computer system which consists of a set of computers capable of executing instructions. Moreover, although FIG. 5 shows the logical order, in some cases, the illustrated or described steps may be carried out in an order different from that described herein.

As illustrated in FIG. 5, the constellation mapping method according to the present embodiment includes processing of Step S502 to Step S504 as follows.

Step S502, as to each modulation symbol unit to be mapped in part of or all of modulation symbol units to be mapped of a bit sequence to be mapped, a plurality of bits in the modulation symbol unit are flipped, wherein the process of flipping the bits in each modulation symbol unit to be mapped indicates: reversing the order of a plurality of bits in the modulation symbol unit to be mapped, for example, for 6 bits, the indexes thereof are respectively 0, 1, 2, 3, 4, and 5, and after being flipped, the indexes thereof become 5, 4, 3, 2, 1, and 0, such that consecutive occurrence of bits with the same reliability in a bit sequence can be avoided.

Step S504, each flipped modulation symbol unit to be mapped is mapped as a modulation symbol in a constellation.

Through the above processing, consecutive occurrence of bits with the same reliability in a bit sequence can be effectively avoided, and thus the link performance can be improved.

In the above processing, before the step of flipping a plurality of bits in each modulation symbol unit to be mapped, the input bit information can firstly be performed with duo-binary turbo encoding to obtain a systematic bit stream A, a systematic bit stream B, a parity bit stream Y1 and a parity bit stream W1 from a first component encoder, a parity bit stream Y2 and a parity bit stream W2 from a second component encoder; and then bit interleaving and sequencing processing are performed on the obtained systematic bit stream A, systematic bit stream B, parity bit stream Y1, parity bit stream W1, parity bit stream Y2, and parity bit stream W2 to obtain the bit sequence to be mapped.

In the above, the bit interleaving and sequencing processing may specifically include: putting the systematic bit stream A in the forefront; putting the systematic bit stream B after the systematic bit stream A; performing bit interleaving on the parity bit stream Y1 and the parity bit steam Y2, and putting the bit interleaved parity bit stream Y1 and parity bit steam Y2 after the systematic bit stream B; putting the parity bit stream W1 before the parity bit stream W2 or putting the parity bit stream W2 before the parity bit stream W1, then performing bit interleaving on the parity bit stream W1 and the parity bit stream W2, and putting the bit interleaved parity bit stream W1 and parity bit stream W2 after the bit interleaved parity bit stream Y1 and parity bit steam Y2.

Moreover, before the step of flipping the bits in part of or all of modulation symbol units to be mapped, at least one re-arrangement version may be used to indicate whether the modulation symbol units to be mapped of the bit sequence to be mapped need to be flipped, wherein each re-arrangement version is used for indicating whether at least one modulation symbol unit to be mapped needs to be flipped. Moreover, in the case that a plurality of re-arrangement versions are used to indicate whether the modulation symbol units to be mapped of the bit sequence to be mapped need to be flipped, the values of the plurality of re-arrangement versions are identical to or different from each other. That is, as to a plurality of modulation symbol units to be mapped of the bit sequence to be mapped, it could either be that each modulation symbol unit to be mapped corresponds to respective re-arrangement version, that a plurality of modulation symbol units to be mapped correspond to one re-arrangement version, or that all of the modulation symbol units to be mapped correspond to one re-arrangement version. Moreover, as to a single bit sequence to be mapped, a plurality of re-arrangement versions thereof may be the same, partially the same, or completely different from each other.

In flipping a plurality of bits of each modulation symbol unit to be mapped in part of or all of modulation symbol units to be mapped, the flipping can be performed by using the following three modes according to the difference in modulation method.

Mode 1: in the case that the modulation method for the bit sequence to be mapped is the QPSK, the number M of the bits in each modulation symbol unit to be mapped is M=2, and the bits in the modulation symbol unit to be mapped are flipped according to the following formula:

$$D_i(j)=j \bmod M$$

Mode 2: in the case that the modulation method for the bit sequence to be mapped is the 16 QAM, the number M of the bits in each modulation symbol unit to be mapped is M=4, and the bits in the modulation symbol unit to be mapped are flipped according to the following formula:

$$D_i(j)=((2r_0+1)j+(2r_1+1)) \bmod M.$$

Mode 3: in the case that the modulation method for the bit sequence to be mapped is the 64 QAM, the number M of the bits in each modulation symbol unit to be mapped is M=6, and the bits in the modulation symbol unit to be mapped are flipped according to the following formula:

$$D_i(j)=((3r_2-1)j+(3r_3-1)) \bmod M.$$

In the above, $D_i(j)$ is a bit index in the modulation unit to be mapped, M is a modulation order, $r_0$, $r_1$, $r_2$, $r_3$ are arbitrary integers, i is an index of the modulation symbol unit to be mapped, and j is a bit index in the modulation symbol unit to be mapped.

Further, as to the QPSK modulation method, the 16 QAM modulation method, and the 64 QAM modulation method, based on the above described three modes, the flipping can be performed through several formulae, for example, the formula may be one of the following:

$$D_i(j) = (-1)^{CRV_i} \cdot j - CRV_i;$$

$$D_i(j) = \frac{M}{2} + (-1)^{CRV_i} \cdot j - CRV_i;$$

$$D_i(j) = \left(\frac{M}{2} - 1\right)^{CRV_i} \cdot j - CRV_i; \text{ and}$$

$$D_i(j) = \left(\frac{M}{2} - 1\right)^{CRV_i} \cdot j + \left(\frac{M}{2} - 1\right) \cdot CRV_i;$$

wherein $CRV_i$ is a re-arrangement version of the $i^{th}$ modulation symbol unit to be mapped. It shall be noted that the formulae given herein are just specific examples, formulae satisfying the above Mode 1, Mode 2 and Mode 3 are all capable of realizing the flipping operation according to the present embodiment, and are all included within the scope of protection of the present invention.

By means of the above processing, unevenness of reliability distribution of the consecutive bits can be changed, such that the phenomenon that consecutive bits have the same reliability can be effectively avoided, and thereby, the problem of link performance decreasing resulted from the above can be solved.

The processing procedure of the constellation mapping method according to the present embodiment is described in conjunction with Example 1 as follows.

EXAMPLE 1

Firstly, the input information bit needs to be performed with duobinary turbo encoding to output 6 data streams, including two systematic bit streams A and B, two parity bit streams Y1 and Y2 from the first component encoder, and two parity bit streams W1 and W2 from the second component encoder.

Then, the data streams A, B, Y1, Y2, W1, and W2 are arranged by using respective sub-block interleavers thereof.

Afterwards, the arranged systematic bit streams A, B are placed in the front, Y1, Y2 are placed in the middle after being performed with bit interleaving, W1, W2 (or W2, W1, the order can be changed) are placed at the end after being performed with bit interleaving, and an output buffer is formed.

Figure 6:
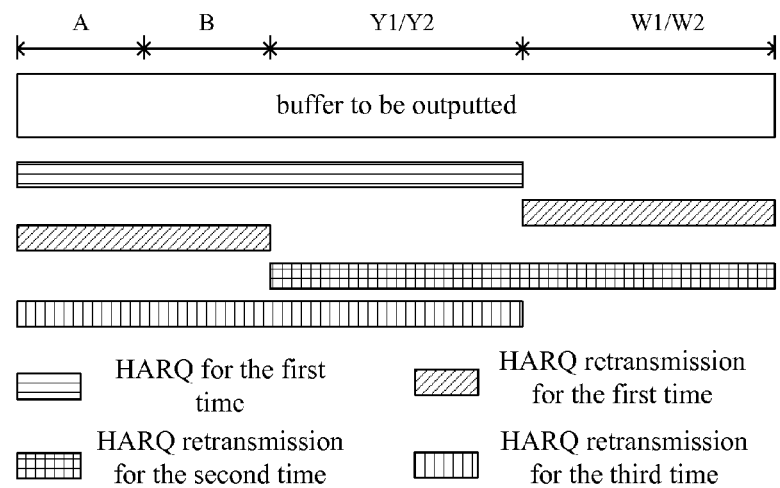
FIG. 6 is a schematic diagram of the generation method of an HARQ subpacket used in the embodiments of the present invention.

Bit selection is performed in the output buffer to obtain an HARQ subpacket to be transmitted (viz. the above bit sequence to be mapped). In this example, the HARQ subpacket can be generated by using a non-adaptive IR HARQ subpacket generation method of the uplink in the IEEE 802.16m, and FIG. 6 is a schematic diagram of the generation of the subpacket of this example.

In order to explain the constellation interleaving method where bits are flipped and shifted, in this example, the index of the bit to be mapped after the interleaving (flipping) can be indicated by using the following formula:

$$D_i(j)=(-1)^{CRV_i} \cdot j - CRV_i,$$

wherein $CRV_i$ is the constellation re-arrangement version of the $i^{th}$ modulation symbol unit to be mapped, i is a symbol index, j is a bit index in the symbol unit to be mapped, and M is the modulation order.

Assuming that the modulation order of an HARQ subpacket transmitted for the first time is the 64 QAM, and that the transmission code rate is 1/2, that is, the subpacket length here is 4 N, and the subpacket can be mapped as $$4N/M = 4N/6 = \frac{2}{3} \cdot N$$

64 QAM symbols; and assuming that the constellation re-arrangement version transmitted for the first time is $CRV_0=0$, the index of the interleaved bit to be mapped which is transmitted for the first time can be obtained, which can be indicated as: $D_i(j)=j$.

Assuming that the modulation order of the HARQ subpacket retransmitted for the first time (of the first retransmission) is also the 64 QAM, and that the transmission code rate is 1/2, the subpacket length here is also 4N, and the subpacket can be mapped as $$4N/M = 4N/6 = \frac{2}{3}N$$

64 QAM symbols, and assuming that the constellation re-arrangement version of the first retransmission is $CRV_0=1$, the index of the interleaved bit to be mapped of the first retransmission can be indicated as: $D_i(j)=-j-1$.

Figure 7:
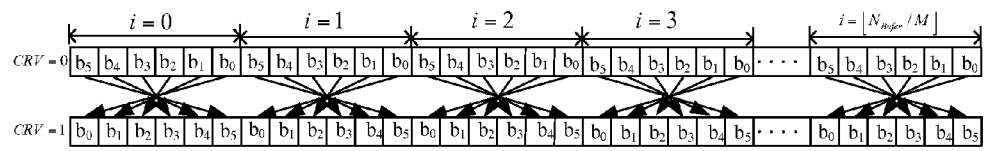
FIG. 7 is a bit sequence pattern before and after constellation interleaving according to method embodiment 1 of the present invention.

FIG. 7 shows patterns before and after interleaving in the case that N=192 (viz. information bit length is 384), CRV=0 and CRV=1 in the present example.

According to FIG. 7, by performing interleaving (flipping in the present embodiment) operation on the bits in the modulation symbol unit to be mapped, the original order of bits can be disarranged, which avoids the phenomenon that bits with the same reliability are consecutively arranged, and improves the overall performance of the link.

Method Embodiment 2

In the present embodiment, a constellation mapping method is provided.

Figure 8:
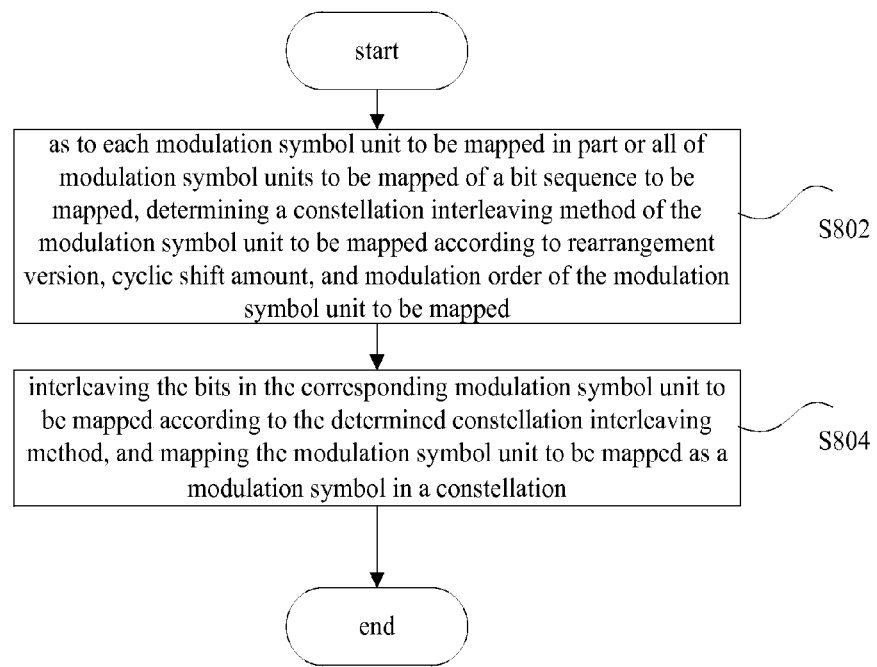
FIG. 8 is a flowchart of the constellation mapping method according to method embodiment 2 of the present invention.

FIG. 8 is a flowchart of the constellation mapping method according to the present embodiment. It shall be explained that steps described in the following method may be carried out in, for example, a computer system which consists of a set of computers capable of executing instructions. Moreover, although FIG. 8 shows the logical order, in some cases, the illustrated or described steps may be carried out in an order different from that described herein. As illustrated in FIG. 8, the constellation mapping method according to the present embodiment includes processing of Step S802 to Step S804 as follows.

Step S802, as to each modulation symbol unit to be mapped in part of or all of modulation symbol units to be mapped of a bit sequence to be mapped, a constellation interleaving method for the modulation symbol unit to be mapped is determined according to a re-arrangement version, a cyclic shift amount, and a modulation order of the modulation symbol unit to be mapped;

Step S804, the bits in the corresponding modulation symbol unit to be mapped are interleaved according to the determined constellation interleaving method, and the modulation symbol unit to be mapped is mapped as a modulation symbol in a constellation.

In the above, the cyclic shift amount mentioned above refers to the amount by which the bit sequence is shifted toward a predetermined direction, for example, as to six bits whose indexes are respectively 0, 1, 2, 3, 4, and 5, assuming that the predetermined direction is left, if the cyclic shift amount is 1, the bit indexes obtained after the bit sequence is shifted left are sequenced as 1, 2, 3, 4, 5, 0; if the cyclic shift amount is changed to 2, the bit indexes obtained after the bit sequence is shifted are sequenced as 2, 3, 4, 5, 0, 1.

Preferably, before the step of determining the constellation interleaving method for each modulation symbol unit to be mapped, the input bit information may be firstly performed with duobinary turbo encoding to obtain a systematic bit stream A, a systematic bit stream B, a parity bit stream Y1 and a parity bit stream W1 from a first component encoder, a parity bit stream Y2 and a parity bit stream W2 from a second component encoder; bit interleaving and sequencing processing are then performed on the obtained systematic bit stream A, systematic bit stream B, parity bit stream Y1, parity bit stream W1, parity bit stream Y2, and parity bit stream W2 to obtain the bit sequence to be mapped.

Specifically, the bit interleaving and sequencing processing here may include: putting the systematic bit stream A in the forefront; putting the systematic bit stream B after the systematic bit stream A; performing bit interleaving on the parity bit stream Y1 and the parity bit steam Y2, and putting the bit interleaved parity bit stream Y1 and parity bit steam Y2 after the systematic bit stream B; putting the parity bit stream W1 before the parity bit stream W2 or putting the parity bit stream W2 before the parity bit stream W1, then performing bit interleaving on the parity bit stream W1 and the parity bit stream W2, and putting the bit interleaved parity bit stream W1 and parity bit stream W2 after the bit interleaved parity bit stream Y1 and parity bit steam Y2.

In the present embodiment, the constellation interleaving method for each modulation symbol unit to be mapped can be determined according to one of the following formulae:

$$D_i(j)=((-1)^{CRV_i}j-CRV_i+\text{ShiftNum}(i))\bmod M,$$

wherein CRV, is 0 or 1;

$$D_i(j)=(-1)^{CRV_i \cdot b}j+(CRV_i+(1-2\cdot CRV_i)\cdot \text{ShiftNum}(i))\cdot b\cdot c,$$

wherein $b=\lfloor M/4 \rfloor$, $c=\lceil (M+CRV_i)/6 \rceil$, and $CRV_i$ is 0 or 1;

$$D_i(j)=((-1)^{CRV_i \cdot b}j+b\cdot((-1)^{a+1}CRV_i+(-1)^{a \cdot CRV_i}\cdot\text{ShiftNum}(i)))\bmod M,$$

wherein $$a=\frac{M}{2}-1, b=\lceil \frac{a}{2} \rceil,$$

and $CRV_i$ is 0 or 1;

$$D_i(j)=((-1)^{CRV_i \cdot b}j+b\cdot((-CRV_i+(-1)^{a \cdot CRV_i}\cdot\text{ShiftNum}(i)))\bmod M,$$

wherein $$a=\frac{M}{2}-1, b=\lceil \frac{a}{2} \rceil,$$

and CRV, is 0 or 1; and $$D_i(j)=((-1)^{CRV_i}j-CRV_i+(-1)^{a \cdot CRV_i}\cdot\text{ShiftNum}(i))\bmod M,$$

wherein $$a=\frac{M}{2}-1 \text{ or } a=3-\frac{M}{2},$$

M=4 or M=6, and $CRV_i$ is 0 or 1.

In the above formulae, $D_i(j)$ is a bit index in the modulation unit to be mapped, M is the modulation order, i is an index of the modulation symbol unit to be mapped, and j is a bit index in the modulation symbol unit to be mapped, $CRV_i$ is the re-arrangement version of the $i^{th}$ modulation symbol unit to be mapped, and ShiftNumber(i) is the cyclic shift amount of the bits in the modulation symbol unit to be mapped. In the above, according to the method of the present embodiment, the flipping and cyclically shifting can be combined as one step, the above re-arrangement version can be construed as being used for indicating whether to perform the flipping operation.

Further, in the above formulae, f( )indicates operation of floor, ceiling, or rounding. Moreover, the multiple f( )appearing in a single formula are irrelative to each other, that is, for example, there are three f( )in a single formula, the first f( )may indicate the operation of ceiling, the second f( )may indicate the operation of floor, and the third f( )may indicate the operation of rounding; in addition, the first f( )may indicate the operation of floor, the second f( )and the third f( )may indicate the operation of rounding. There are many variations for this, regarding the following method embodiment 3, similar variations may be used, and the details will not be described any more.

Specifically, regarding the value for M, the following method is used: when the modulation method of the bit sequence to be mapped is the QPSK, M=2; when the modulation method of the bit sequence to be mapped is the 16 QAM, M=4; and when the modulation method of the bit sequence to be mapped is the 64 QAM, M=6.

The re-arrangement version described in the present embodiment is used for indicating whether the flipping processing is included in the constellation interleaving process, and at least one re-arrangement version can exist in the bit sequence to be mapped for indicating whether the modulation symbol units to be mapped of the bit sequence to be mapped need to be flipped, wherein each re-arrangement version is used for indicating whether at least one modulation symbol unit to be mapped needs to be flipped. Moreover, in the case that a plurality of re-arrangement versions are used to indicate whether the modulation symbol units to be mapped of the bit sequence to be mapped need to be flipped, the values of the plurality of re-arrangement versions may be identical to or different from each other. That is, as to a plurality of modulation symbol units to be mapped of the bit sequence to be mapped, it could either be that each modulation symbol unit to be mapped corresponds to respective re-arrangement version, or that a plurality of modulation symbol units to be mapped correspond to one re-arrangement version, or that all of the modulation symbol units to be mapped correspond to one re-arrangement version. Moreover, as to a single bit sequence to be mapped, a plurality of re-arrangement versions thereof may be the same, partially the same, or completely different from each other.

The constellation mapping method according to the present embodiment is described in conjunction with a specific example.

EXAMPLE 2

In this example, firstly, the input information bit is firstly performed with duobinary turbo encoding to output 6 data streams, including two systematic bit streams A and B, two parity bit streams Y1 and Y2 from the first component encoder, and two parity bit streams W1 and W2 from the second component encoder.

Then, the data streams A, B, Y1, Y2, W1, and W2 are arranged by using respective sub-block interleavers thereof Afterwards, the arranged systematic bit streams A, B are placed in the front, Y1, Y2 are placed in the middle after being bit interleaved, W1, W2 (or W2, W1, the order can be changed) are placed at the end after being bit interleaved, and an output buffer is formed.

Bit selection is performed in the output buffer to obtain an HARQ subpacket to be transmitted, viz. the bit sequence to be mapped. In this example, the HARQ subpacket can be generated by using a non-adaptive IR HARQ subpacket generation method of the uplink in the IEEE 802.16m.

Furthermore, the cyclic shift amount in this example can be indicated by using the following formula:

$$ShiftNum(i) = i - \left\lfloor \frac{i}{N_s} \right\rfloor \cdot N_s + \left\lfloor \frac{i}{N_s} \right\rfloor \bmod 2$$

$$i \in [0, N_{buffer}/M - 1].$$

Figure 9:
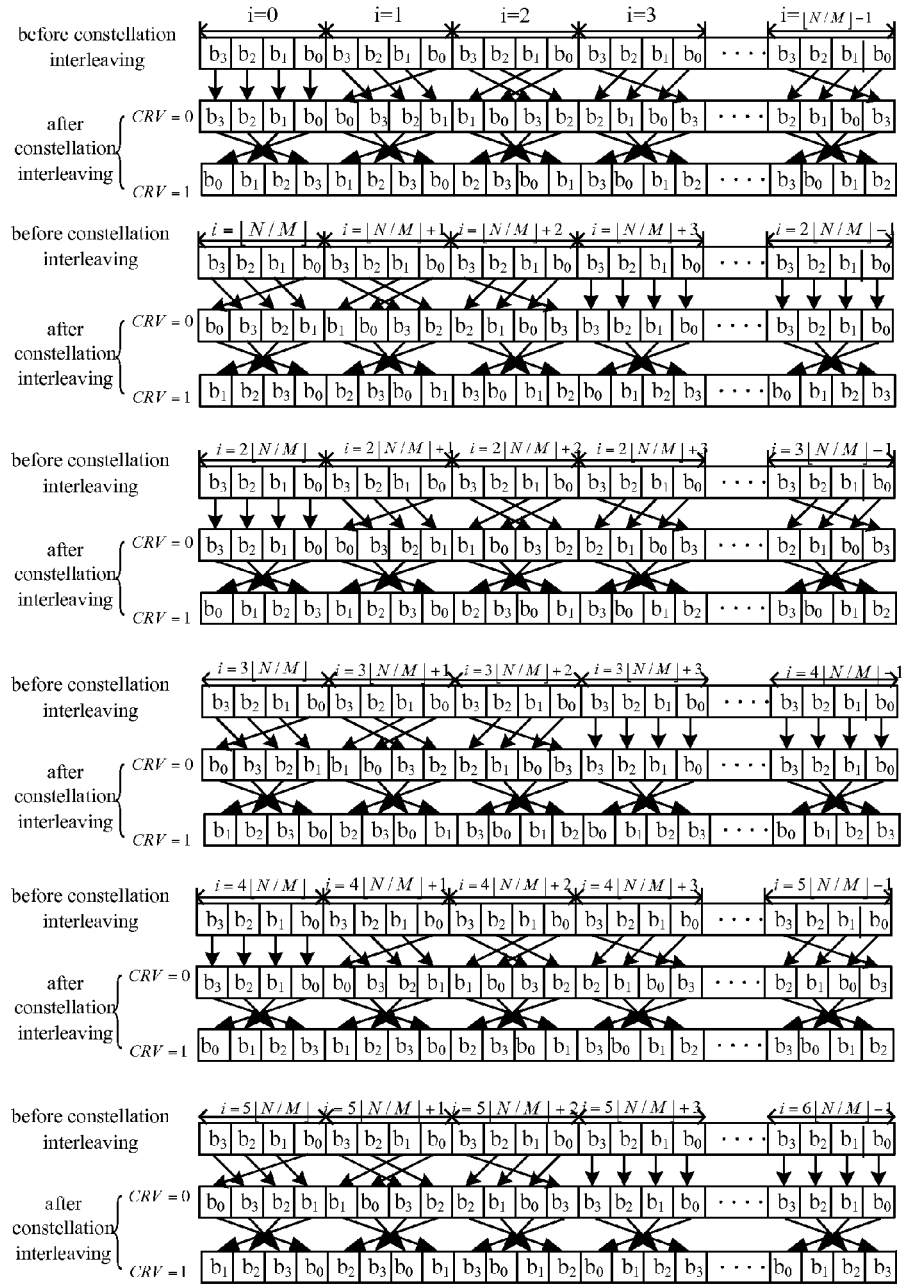
FIG. 9 is a bit sequence pattern before and after constellation interleaving according to method embodiment 2 of the present invention.

FIG. 9 shows constellation patterns before and after interleaving in the case that N=192 (viz. information bit length is 384), CRV=0 and CRV=1, and i is of different values in the present example.

It is assumed that the modulation order of an HARQ subpacket transmitted for the first time (of the first transmission) is the 16 QAM, and that the transmission code rate is 1/2, that is, the subpacket length is 4 N, and the subpacket can be mapped as 4 N/M=4 N/4=N 16 QAM symbols. The constellation re-arrangement version of the first transmission is $CRV_0=0$ (for indicating that the bits of the HARQ subpacket of the first transmission are not flipped), the position of the HARQ subpacket of the first transmission is the $0^{th}$ symbol, and a first bit interleaving rule is used.

Assuming that the modulation order of the HARQ subpacket retransmitted for the first time (of the first retransmission) is also the 16 QAM, and that the transmission code rate is 1/2, the subpacket length is 4 N, and the subpacket can be mapped as 4 N/M=4 N/4 =N 16 QAM symbols. The constellation re-arrangement version of the first retransmission is $CRV_i=1$ (for indicating that bits of the HARQ subpacket of the first retransmission are flipped), the starting position of the HARQ subpacket of the first retransmission is the $2\lfloor N/M \rfloor+\lfloor 2N/M \rfloor^{th}$ symbol, and a second interleaving rule is used.

The interleaving rules for the first transmission and the retransmission are described, taking a closed-form formula as an example, assuming that the following closed-form formula is used:

$$D_i(j)=((-1)^{CRV_i} \cdot j-CRV_i+ShiftNum(i)) \bmod M;$$

then, after the introduction of the expression for ShiftNum (i), the closed-form formula become:

$$D_i(j) = \left((-1)^{CRV_i} \cdot j - CRV_i + i - \left\lfloor \frac{i}{N_s} \right\rfloor \cdot N_s + \left\lfloor \frac{i}{N_s} \right\rfloor \bmod 2\right) \bmod M.$$

For the first transmission, assuming $CRV_0=0$, then the bit index is:

$$D_i(j) = \left(j + i - \left\lfloor \frac{i}{N_s} \right\rfloor \cdot N_s + \left\lfloor \frac{i}{N_s} \right\rfloor \bmod 2\right) \bmod 4.$$

For the first retransmission, assuming $CRV_1=1$, then the bit index is:

$$D_i(j) = \left(-j - 1 + i - \left\lfloor \frac{i}{N_s} \right\rfloor \cdot N_s + \left\lfloor \frac{i}{N_s} \right\rfloor \bmod 2\right) \bmod 4.$$

Through the above processing, the closed-form analytical method is realized, viz. flipping and shifting may be completed in a one-step processing, such that for different modulation methods or different constellation re-arrangement versions, a processing of uniform form can be performed, and the process is simple and complete.

Method Embodiment 3

In the present embodiment, a constellation mapping method is provided.

Figure 10:
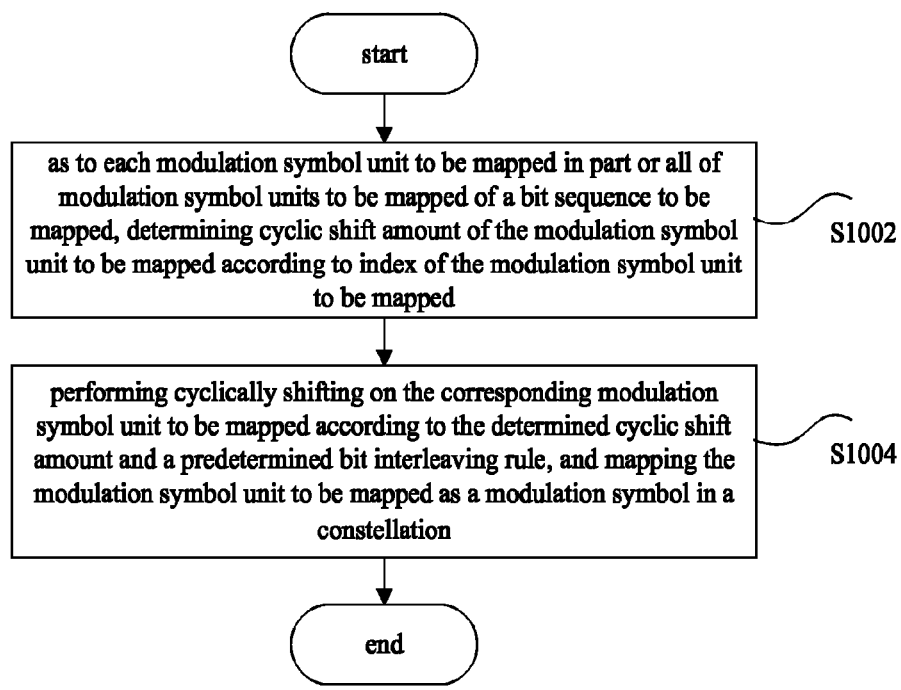
FIG. 10 is a flowchart of the constellation mapping method according to method embodiment 3 of the present invention.

FIG. 10 is a flowchart of the constellation mapping method according to the present embodiment. It shall be explained that steps described in the following method may be carried out in, for example, a computer system which consists of a set of computers capable of executing instructions. Moreover, although FIG. 10 shows the logical order, in some cases, the illustrated or described steps may be carried out in an order different from that described herein. As illustrated in FIG. 10, the constellation mapping method according to the present embodiment includes processing of Step S1002 to Step S1004 as follows.

Step S1002, as to each modulation symbol unit to be mapped in part of or all of modulation symbol units to be mapped of a bit sequence to be mapped, the cyclic shift amount of the modulation symbol unit to be mapped is determined according to the index of the modulation symbol unit to be mapped;

Step S1004, a corresponding modulation symbol unit to be mapped is performed with cyclically shifting according to the determined cyclic shift amount and a predetermined bit interleaving rule, and the modulation symbol unit to be mapped is mapped as a modulation symbol in a constellation.

In the above, before the step of determining the cyclic shift amount of each modulation symbol unit to be mapped, the input bit information may be firstly performed with duobinary turbo encoding to obtain a systematic bit stream A, a systematic bit stream B, a parity bit stream Y1 and a parity bit stream W1 from a first component encoder, a parity bit stream Y2 and a parity bit stream W2 from a second component encoder; bit interleaving and sequencing processing are performed on the obtained systematic bit stream A, systematic bit stream B, parity bit stream Y1, parity bit stream W1, parity bit stream Y2, and parity bit stream W2 to obtain the bit sequence to be mapped.

Specifically, the above mentioned bit interleaving and sequencing processing may include: putting the systematic bit stream A in the forefront; putting the systematic bit stream B after the systematic bit stream A; performing bit interleaving on the parity bit stream Y1 and the parity bit steam Y2, and putting the bit interleaved parity bit stream Y1 and parity bit steam Y2 after the systematic bit stream B; putting the parity bit stream W1 before the parity bit stream W2 or putting the parity bit stream W2 before the parity bit stream W1, then performing bit interleaving on the parity bit stream W1 and the parity bit stream W2, and putting the bit interleaved parity bit stream W1 and parity bit stream W2 after the bit interleaved parity bit stream Y1 and parity bit steam Y2.

Furthermore, the above mentioned predetermined bit interleaving rule includes at least one of the following:

a first bit interleaving rule, for each modulation symbol unit to be mapped, shifting a plurality of bits in the modulation symbol unit to be mapped according to the cyclic shift amount of the modulation symbol unit to be mapped; and a second bit interleaving rule, shifting a plurality of bits in each modulation symbol unit to be mapped according to the first bit interleaving rule, and re-arranging the plurality of shifted bits according to reliabilities of the plurality of bits.

The predetermined bit interleaving rule in the present embodiment is described in detail as follows.

The First Bit Interleaving Rule

In the first bit interleaving rule, the cyclic shift amount of each modulation symbol unit to be mapped can be determined according to the following formula:

$$ShiftNum(i) = \begin{cases} i \bmod M & i \in [0, \lfloor N/M \rfloor - 1] \\ (i+1+\delta - \lfloor N/M \rfloor) \bmod M & i \in [\lfloor N/M \rfloor, 2\lfloor N/M \rfloor - 1] \\ (i+1-2\lfloor N/M \rfloor) \bmod M & i \in [2\lfloor N/M \rfloor, 2\lfloor N/M \rfloor + \lfloor 2N/M \rfloor - 1] \\ (i+1-2\lfloor N/M \rfloor + \lfloor 2N/M \rfloor) \bmod M & i \in [2\lfloor N/M \rfloor + \lfloor 2N/M \rfloor, 2\lfloor N/M \rfloor + 2\lfloor 2N/M \rfloor - 1], \end{cases}$$

wherein N is half of the length of information bits, $D_i(j)$ is a bit index in the modulation unit to be mapped, M is a modulation order, i is an index of the modulation symbol unit to be mapped, and j is a bit index in the modulation symbol unit to be mapped, $CRV_i$ is the re-arrangement version of the $i^{th}$ modulation symbol unit to be mapped, ShiftNumber(i) is the cyclic shift amount of the bits in the modulation symbol unit to be mapped, f( ) indicates operation of floor, ceiling, or rounding, and δ is a correlated quantity of the modulation order, wherein when the bit sequence to be mapped uses a modulation method of the 64 QAM, δ=1; and when the bit sequence to be mapped uses other modulation method, δ=0.

Here, the bit index $D_i(j)$ after the cyclic shift and re-arrangement may be indicated through the following formulae:

$$D_i(j) = (j + ShiftNum(i)) \bmod M, \text{ and}$$

$$D_i(j) = \begin{cases} (j+i) \bmod M & i \in [0, \lfloor N/M \rfloor - 1] \\ (j+i+1+\delta - \lfloor N/M \rfloor) \bmod M & i \in [\lfloor N/M \rfloor, 2\lfloor N/M \rfloor - 1] \\ (j+i+1-2\lfloor N/M \rfloor) \bmod M & i \in [2\lfloor N/M \rfloor, 2\lfloor N/M \rfloor + \lfloor 2N/M \rfloor - 1] \\ (j+i+1-2\lfloor N/M \rfloor + \lfloor 2N/M \rfloor) \bmod M & i \in [2\lfloor N/M \rfloor + \lfloor 2N/M \rfloor, 2\lfloor N/M \rfloor + 2\lfloor 2N/M \rfloor - 1]. \end{cases}$$

In addition, in the first bit interleaving rule, the cyclic shit amount of each modulation symbol unit to be mapped can be determined according to the following formula:

$$ShiftNum(i) = i - \left\lfloor \frac{i}{N_s} \right\rfloor \cdot N_s + \left\lfloor \frac{i}{N_s} \right\rfloor \bmod 2$$

$$i \in [0, N_{buffer}/M - 1],$$

wherein, i is an index of the modulation symbol unit to be mapped, $N_{buffer}$ is the size of an output buffer after encoding, $N_{buffer}/M$ is the number of symbols contained in the output buffer, M is the modulation order, $N_s = \lfloor N/M \rfloor$ is the number of symbols contained in one data stream, and f( ) indicates the operation of floor, ceiling, or rounding.

In addition, in the first bit interleaving rule, the cyclic shit amount of each modulation symbol unit to be mapped can also be determined according to the following formula:

$$ShiftNum(i) = \begin{cases} (i) \bmod M, & i \in [0, N_S - 1], j \in [0, M-1] \\ (i - N_S + 1) \bmod M, & i \in [N_S, 2N_S - 1], j \in [0, M-1] \\ (i - 2N_S) \bmod M, & i \in [2N_S, 3N_S - 1], j \in [0, M-1] \\ (i - 3N_S + 1) \bmod M, & i \in [3N_S, 4N_S - 1], j \in [0, M-1] \\ (i - 4N_S + 1) \bmod M, & i \in [4N_S, 5N_S - 1], j \in [0, M-1] \\ (i - 5N_S) \bmod M, & i \in [5N_S, R - 1], j \in [0, M-1], \end{cases}$$

wherein, i is an index of the modulation symbol unit to be mapped, $N_{buffer}$ is the size of an output buffer after the encoding, $N_{buffer}/M$ is the number of symbols contained in the output buffer, M is the modulation order, $N_s = \lfloor N/M \rfloor$ is the number of symbols contained in one data stream, and f( ) indicates the operation of floor, ceiling, or rounding.

The Second Bit Interleaving Rule

In the second bit interleaving rule, the step of re-arranging the plurality of shifted bits according to reliabilities of the plurality of bits includes one of the following:

(1) determining bits of high reliability, bits of low reliability and bits of medium reliability in the plurality of bits, and exchanging the position of the bits of high reliability and the position of the bits of low reliability; that is, for six bits with the indexes 1, 2, 3, 4, 5, and 6, assuming that the reliabilities thereof are in sequence of: high, medium, low, high, medium, low, the bits obtained can be 3, 2, 1, 6, 5, 4, or 6, 2, 4, 3, 5, 1 when this method is used; and (2) determining bits of high reliability, bits of low reliability and bits of medium reliability in the plurality of bits, and flipping the order of the indexes of the plurality of bits, wherein the flipping process is similar to that described in Method Embodiment 1.

Moreover, regarding a plurality of modulation symbol units to be mapped in the bit sequence to be mapped, identical or different re-arrangement modes can be used.

Specifically, in the second bit interleaving rule, the bit index $D_i(j)$ after the cyclic shift and re-arrangement can be indicated through the following formulae:

Mode (1): in the case that the modulation method for the bit sequence to be mapped is the QPSK, $$D_i(j) = j \bmod M;$$

Mode (2): in the case that the modulation method for the bit sequence to be mapped is the 16 QAM, $$D_i(j)=((2r_0+1)j+(2r_1+1)\cdot ShifiNumber(i)+(2r_2+1))\bmod M;\text{ and}$$

Mode (3): in the case that the modulation method for the bit sequence to be mapped is the 64 QAM, $$D_i(j)=((3r_3-1)j+(3r_4+1)\cdot ShiftNumber(i)+(3r_5-1))\bmod M$$

In the above, M is the modulation order, $D_i(j)$ is a bit index in the modulation unit to be mapped, $r_0$, $r_1$, $r_2$, $r_3$, $r_4$, $r_5$ are arbitrary integers, ShiftNumber(i) is the cyclic shift amount of the modulation symbol unit to be mapped determined by the first bit interleaving rule, $CRV_i$, is the re-arrangement version of the $i^{th}$ modulation symbol unit to be mapped, and i is an index of the modulation symbol unit to be mapped.

Further, f( ) appearing in the formulae in the present embodiment indicates the operation of floor, ceiling, or rounding, and the multiple f( ) appearing in a single formula are irrelative to each other.

Specifically, as for the QPSK modulation method, the 16 QAM modulation method, and the 64 QAM modulation method, the bit index after the cyclic shift and re-arrangement can be indicated through several formulae, and these formulae shall meet the conditions defined in the formulae in the above Mode (1), Mode (2), and Mode (3). For example, in practical application, the bit index $D_i(j)$ after the cyclic shift and re-arrangement can be indicated through one of the following formulae:

$$D_i(j)=(-1)^{CRV_i \cdot b}j+(CRV_i+(1-2\cdot CRV_i)\cdot ShiftNum(i))\cdot b\cdot c,$$

wherein $b=\lfloor M/4 \rfloor$, $c=\lceil (M+CRV_i)/6 \rceil$, and CRV, is 0 or 1;

$$D_i(j)=((-1)^{CRV_i \cdot b}j+b\cdot((-1)^{a+1}CRV_i+(-1)^{a\cdot CRV_i}\cdot ShiftNum(i)))\bmod M,$$

wherein $$a=\frac{M}{2}-1,\ b=\left\lceil\frac{a}{2}\right\rceil,$$

and $CRV_i$ is 0 or 1;

$$D_i(j)=((-1)^{CRV_i \cdot b}j+b\cdot(-CRV_i+(-1)^{a\cdot CRV_i}\cdot ShiftNum(i)))\bmod M,$$

wherein $$a=\frac{M}{2}-1,\ b=\left\lceil\frac{a}{2}\right\rceil,$$

and $CRV_i$ is 0 or 1;

$$D_i(j)=((-1)^{CRV_i}j-CRV_i+(-1)^{a\cdot CRV_i}\cdot ShiftNum(i))\bmod M,$$

wherein $$a=\frac{M}{2}-1\ \text{or}\ a=3-\frac{M}{2},$$

M=4 or 6, and CRV, is 0 or 1; and $$D_i(j)=((-1)^{CRV_i}j-CRV_i+ShiftNum(i))\bmod M,$$

wherein, CRV, is 0 or 1.

It shall be noted that the formulae given herein are just specific examples, formulae satisfying the above Mode (1), Mode (2) and Mode (3) are all capable of realizing the flipping operation according to the present embodiment, and are all concluded within the scope of protection of the present invention.

In practical application, for each bit sequence to be mapped, a re-arrangement version may be used to indicate that one or more of modulation symbol units to be mapped in the bit sequence to be mapped merely use the first bit interleaving rule, or merely use the second bit interleaving rule. For example, the re-arrangement version being 0 indicates that the first bit interleaving rule is used, and the re-arrangement version being 1 indicates that the second bit interleaving rule is used. Moreover, some of a plurality of modulation symbol units to be mapped in one bit sequence to be mapped may use the first bit interleaving rule for cyclic shifting, and the rest may use the second bit interleaving rule for cyclic shifting.

In addition, regarding the value for M, the following method is used: when the modulation method of the bit sequence to be mapped is the QPSK, M=2; when the modulation method of the bit sequence to be mapped is the 16 QAM, M=4; and when the modulation method of the bit sequence to be mapped is the 64 QAM, M=6.

The re-arrangement version described in the present embodiment is used for indicating whether flipping processing is included in the constellation interleaving process, and at least one re-arrangement version can exist in the bit sequence to be mapped for indicating whether the modulation symbol units to be mapped of the bit sequence to be mapped need to be flipped. In the above, each re-arrangement version is used for indicating whether at least one modulation symbol unit to be mapped needs to be flipped. Moreover, in the case that a plurality of re-arrangement versions are used to indicate whether the modulation symbol units to be mapped of a bit sequence to be mapped need to be flipped, the values of the plurality of re-arrangement versions may be identical to or different from each other. That is, as to a plurality of modulation symbol units to be mapped of a bit sequence to be mapped, it could either be that each modulation symbol unit to be mapped corresponds to respective re-arrangement version, that a plurality of modulation symbol units to be mapped correspond to one re-arrangement version, or that all of the modulation symbol units to be mapped correspond to one re-arrangement version. Moreover, as to a single bit sequence to be mapped, a plurality of re-arrangement versions thereof may be the same, partially the same, or completely different from each other.

The description is given in conjunction with a specific example as follows.

EXAMPLE 3

In this example, firstly, the input information bit needs to be performed with duobinary turbo encoding to output 6 data streams, including two systematic bit streams A and B, two parity bit streams Y1 and Y2 from the first component encoder, and two parity bit streams W1 and W2 from the second component encoder.

Then, the data streams A, B, Y1, Y2, W1, and W2 are arranged by using respective sub-block interleavers thereof; then, the arranged systematic bit streams A, B are placed in the front, Y1, Y2 are placed in the middle after being performed with bit interleaving, W1, W2 (or W2, W1, the order can be changed) are placed at the end after being performed with bit interleaving, and an output buffer is formed.

Afterwards, bit selection is performed in the output buffer to obtain an HARQ subpacket to be transmitted, viz. the bit sequence to be mapped. The HARQ subpacket in this example is generated by using a non-adaptive IR HARQ subpacket generation method of the uplink in the IEEE 802.16m. FIG. 6 is a schematic diagram of the generation of a subpacket.

It is assumed that the modulation order of an HARQ subpacket transmitted for the first time (of the first transmission) is the 64 QAM, and that the transmission code rate is 1/2, that is, the subpacket length is 4 N, and the subpacket can be mapped as $$4N/M = 4N/6 = \frac{2}{3} \cdot N$$

64 QAM symbols. The constellation re-arrangement version of the first transmission is $CRV_0=0$, and a first bit interleaving rule is used.

The cyclic shift amount of each symbol unit to be mapped can be calculated as follows:

$$ShiftNum(i) = \begin{cases} i \bmod M & i \in [0, \lfloor N/M \rfloor - 1] \\ (i+1+\delta - \lfloor N/M \rfloor) \bmod M & i \in [\lfloor N/M \rfloor, 2\lfloor N/M \rfloor - 1] \\ (i+1-2\lfloor N/M \rfloor) \bmod M & i \in [2\lfloor N/M \rfloor, 2\lfloor N/M \rfloor + \lfloor 2N/M \rfloor - 1] \\ (i+1-2\lfloor N/M \rfloor + \lfloor 2N/M \rfloor) \bmod M & i \in [2\lfloor N/M \rfloor + \lfloor 2N/M \rfloor, 2\lfloor N/M \rfloor + 2\lfloor 2N/M \rfloor - 1] \end{cases}$$

$$= \begin{cases} i \bmod 6 & i \in [0, \lfloor N/6 \rfloor - 1] \\ (i+2-\lfloor N/6 \rfloor) \bmod 6 & i \in [\lfloor N/6 \rfloor, 2\lfloor N/6 \rfloor - 1] \\ (i+1-2\lfloor N/6 \rfloor) \bmod 4 & i \in [2\lfloor N/6 \rfloor, 2\lfloor N/6 \rfloor + \lfloor 2N/6 \rfloor - 1], \end{cases}$$

wherein, $\lfloor \cdot \rfloor$ indicates the operation of floor, $\delta$ is a quantity relative to the modulation order, and when the modulation method is the 64 QAM, $\delta=1$.

Figure 11:
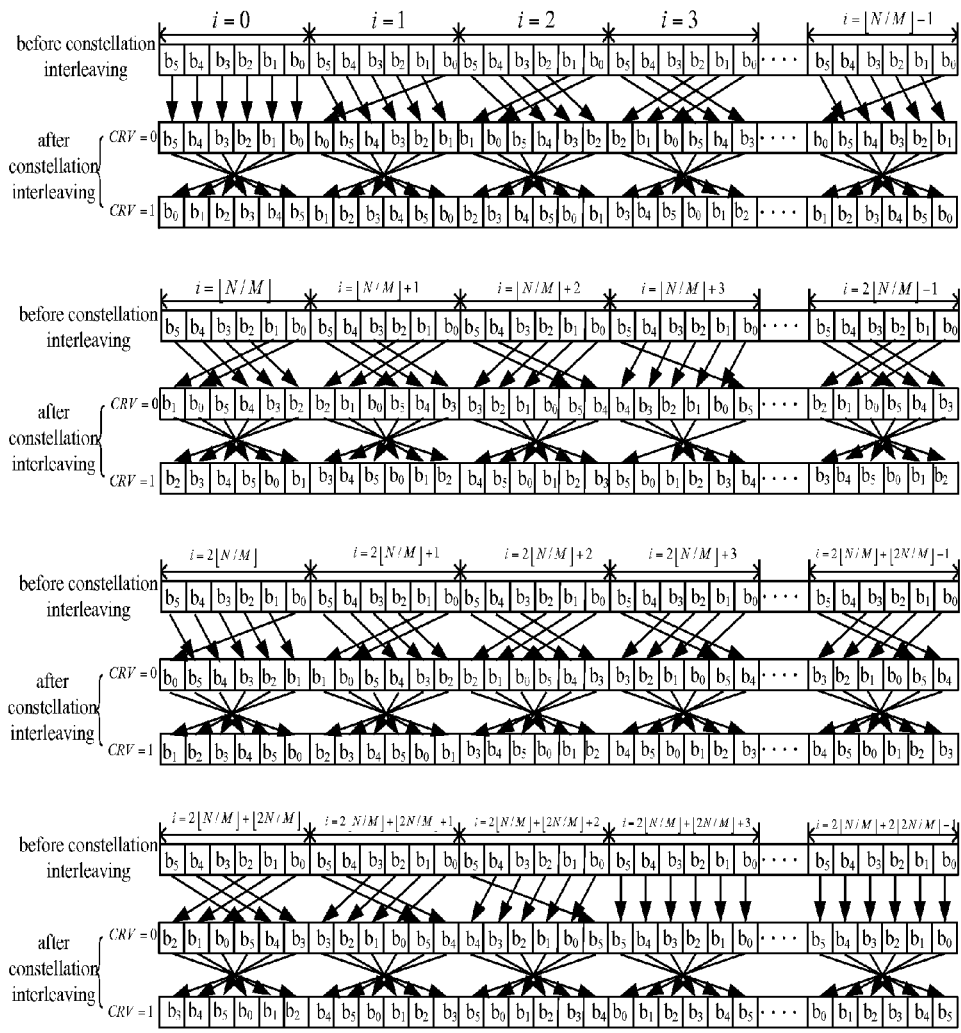
FIG. 11 is a bit sequence pattern before and after constellation interleaving according to method embodiment 3 of the present invention.

FIG. 11 shows patterns before and after interleaving in the case that N=192 (viz. information bit length is 384), CRV=0 and CRV=1.

In the first bit interleaving rule, the index $D_i(j)$ of the interleaved bit sequence is:

$$D_i(j) = (j + ShiftNum(i)) \bmod M$$

$$= \begin{cases} (j+i) \bmod M & i \in [0, \lfloor N/M \rfloor - 1] \\ (j+i+1+\delta - \lfloor N/M \rfloor) \bmod M & i \in [\lfloor N/M \rfloor, 2\lfloor N/M \rfloor - 1] \\ (j+i+2-2\lfloor N/M \rfloor) \bmod M & i \in [2\lfloor N/M \rfloor, 2\lfloor N/M \rfloor + \lfloor 2N/M \rfloor - 1] \\ (j+i+1-2\lfloor N/M \rfloor + \lfloor 2N/M \rfloor) \bmod M & i \in [2\lfloor N/M \rfloor + \lfloor 2N/M \rfloor, 2\lfloor N/M \rfloor + 2\lfloor 2N/M \rfloor - 1] \end{cases}$$

$$= \begin{cases} (j+i) \bmod 6 & i \in [0, \lfloor N/6 \rfloor - 1] \\ (j+i+1-\lfloor N/6 \rfloor) \bmod 6 & i \in [\lfloor N/6 \rfloor, 2\lfloor N/6 \rfloor - 1] \\ (j+i+1-2\lfloor N/6 \rfloor) \bmod 6 & i \in [2\lfloor N/6 \rfloor, 2\lfloor N/6 \rfloor + \lfloor 2N/6 \rfloor - 1]. \end{cases}$$

Then, the interleaved bit sequence is mapped as a modulation symbol, taking each M=6 bits as the unit.

It is assumed that the modulation order of an HARQ subpacket retransmitted for the first time (of the first retransmission) is also the 64 QAM, and that the transmission code rate is 1/2, that is, the subpacket length here is 4 N, and the subpacket can be mapped as $$4N/M = 4N/6 = \frac{2}{3}N$$

64 QAM symbols. The constellation re-arrangement version of the first retransmission is $CRV_0=1$, and the second bit interleaving rule is used.

In the second bit interleaving rule, when the modulation method is the 16 QAM, viz. when M=4, the bit arrangement in each interleaved symbol can be indicated as:

$$D_i(j) = ((3r_3 - 1)j + (3r_4 + 1) \cdot ShiftNumber(i) + (3r_5 - 1)) \bmod M$$

$$= ((3r_3 - 1)j + (3r_4 + 1) \cdot ShiftNumber(i) + (3r_5 - 1)) \bmod 6,$$

wherein $r_3$, $r_4$, $r_5$ may be arbitrary integers, ShiftNumber(i) is the cyclic shift amount of each symbol calculated by the first interleaving rule, and i is a symbol index.

Here, for the convenience of description, taking $r_3=-1$, $r_4=-1$, $r_5=1$, the corresponding closed-form (viz. the formula can unify modulation methods such as the 16 QAM and the 64 QAM, and the first bit interleaving rule and the second bit interleaving rule) formula is:

$$C_i(j) = ((-1)^{CRV_i} j - CRV_i + (-1)^{a \cdot CRV_i} \cdot ShiftNum(i)) \bmod M,$$

wherein $$a = \frac{M}{2} - 1,$$

and $CRV_i=0$ or $CRV_i=1$, viz. $C(j) = (-j - 1 + ShiftNum(i)) \bmod 6$.

Assuming that the HARQ subpacket is generated by using a non-adaptive HARQ subpacket generation method of the uplink in the IEEE 802.16m, the starting position for the HARQ subpacket of the first retransmitting in the present example is the $2\lfloor N/M \rfloor + \lfloor 2N/M \rfloor^{th}$ symbol, and the cyclic shift amount ShiftNum(i) of each symbol unit to be mapped is calculated as follows:

$$ShiftNum(i) = \begin{cases} i \bmod M & i \in [0, \lfloor N/M \rfloor - 1] \\ (i+1+\delta - \lfloor N/M \rfloor) \bmod M & i \in [\lfloor N/M \rfloor, 2\lfloor N/M \rfloor - 1] \\ (i+1-2\lfloor N/M \rfloor) \bmod M & i \in [2\lfloor N/M \rfloor, 2\lfloor N/M \rfloor + \lfloor 2N/M \rfloor - 1] \\ (i+1-2\lfloor N/M \rfloor + \lfloor 2N/M \rfloor) \bmod M & i \in [2\lfloor N/M \rfloor + \lfloor 2N/M \rfloor, 2\lfloor N/M \rfloor + 2\lfloor 2N/M \rfloor - 1] \end{cases}$$

$$= \begin{cases} i \bmod 6 & i \in [0, \lfloor N/6 \rfloor - 1] \\ (i+2-\lfloor N/6 \rfloor) \bmod 6 & i \in [\lfloor N/6 \rfloor, 2\lfloor N/6 \rfloor - 1] \\ (i+1-2\lfloor N/6 \rfloor + \lfloor 2N/6 \rfloor) \bmod 6 & i \in [2\lfloor N/6 \rfloor + \lfloor 2N/6 \rfloor, 2\lfloor N/6 \rfloor + 2\lfloor 2N/6 \rfloor - 1]. \end{cases}$$

The interleaved bit sequence is mapped as a modulation symbol, taking each M=6 bits as the unit.

If the constellation re-arrangement version of the second retransmission is $CRV_2=0$, then the first bit interleaving rule is used for the second retransmission; if the constellation re-arrangement version of the third retransmission is $CRV_3=1$, then the second bit interleaving rule is used for the third retransmission, which are respectively similar to the first transmission and the first retransmission, and the details will not be described herein.

By means of the method of the present embodiments, the flipping and cyclic shift of bits can be realized, and thereby, consecutive occurrence of bits with the same reliability can be avoided.

Owing to the above mentioned, by means of the technical solutions of the present invention, the phenomenon that consecutive bits have the same reliability can be effectively avoided by changing the unevenness of reliability distribution of the consecutive bits. Meanwhile, the present invention provides a closed-form analytical method, and there is a uniform form for different modulation methods and different constellation re-arrangement versions, which has the characteristics of simplicity and completeness. Furthermore, the present invention gives full consideration to the combination of the bit grouping technique with the constellation re-arrangement technique, which simplifies the processing flow. For constellation version 0, the operation of cyclic shifting in one symbol is performed, and thus can achieve the object of optimizing bit grouping. In constellation version 1, position exchange between bits of high reliability and bits of low reliability is taken into account based on the operation of the cyclic shift, which can realize the function of constellation re-arrangement. Moreover, the constellation version 0 and the constellation version 1 both can support cyclic shift in any length. In addition, the present invention is carried out without modifications to the system construction and the current processing flow, thus the present invention is easy to carry out, is easy to promote in the technical field, and has a strong industrial applicability.

Apparently, those skilled in the art shall understand that, all the modules or steps of the present invention as described above may be realized by using general calculating means, they could be integrated in single calculating means, or be distributed in a network consisting of several calculating means, alternatively, they could be implemented through program codes executable in calculating means, and thereby, they could be stored in a storage device and be executed by calculating means, or they are made into corresponding integrated circuit modules, or the multiple modules or steps thereof are made into a single integrated circuit module. Therefore, the present invention is not limited to any specific combination of hardware and software.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all included in the scope of protection of the present invention.

What is claimed is:

1. A constellation mapping method, comprising:
    flipping a plurality of bits in each modulation symbol unit to be mapped in part of or all of modulation symbol units to be mapped of a bit sequence to be mapped;
    mapping each flipped modulation symbol unit to be mapped as a modulation symbol in a constellation; and
    wherein flipping the bits in each modulation symbol unit to be mapped indicates:
reversing an order of the plurality of bits in the modulation symbol unit to be mapped.

2. The method according to claim 1, wherein before the step of flipping a plurality of bits in each modulation symbol unit to be mapped, the method further comprises:
    performing duobinary turbo encoding on input bit information to obtain a systematic bit stream A, a systematic bit stream B, a parity bit stream Y1 and a parity bit stream W1 from a first component encoder, a parity bit stream Y2 and a parity bit stream W2 from a second component encoder; and
    performing bit interleaving and sequencing processing on the obtained systematic bit stream A, systematic bit stream B, parity bit stream Y1, parity bit stream W1, parity bit stream Y2, and parity bit stream W2 to obtain the bit sequence to be mapped.

3. The method according to claim 2, wherein the bit interleaving and sequencing processing comprises:
    putting the systematic bit stream A in the forefront;
    putting the systematic bit stream B after the systematic bit stream A;
    performing bit interleaving on the parity bit stream Y1 and the parity bit steam Y2, and putting the bit interleaved parity bit stream Y1 and parity bit steam Y2 after the systematic bit stream B; and
    putting the parity bit stream W1 before the parity bit stream W2 or putting the parity bit stream W2 before the parity bit stream W1, performing bit interleaving on the parity bit stream W1 and the parity bit stream W2, and putting the bit interleaved parity bit stream W1 and parity bit stream W2 after the bit interleaved parity bit stream Y1 and parity bit steam Y2.

4. The method according to claim 1, wherein before the step of flipping bits in part of or all of the modulation symbol units to be mapped, the method further comprises:
    indicating, through at least one re-arrangement version, whether the modulation symbol units to be mapped of the bit sequence to be mapped need to be flipped, wherein each re-arrangement version is used for indicating whether at least one modulation symbol unit to be mapped needs to be flipped, and in the case that a plurality of re-arrangement versions are used to indicate whether the modulation symbol units to be mapped of the bit sequence to be mapped need to be flipped, the values of the plurality of re-arrangement versions are identical to or different from each other.

5. The method according to claim 1, wherein the step of flipping a plurality of bits of each modulation symbol unit to be mapped in part of or all of the modulation symbol units to be mapped comprises one of the following:

in the case that a modulation method for the bit sequence to be mapped is a QPSK, the number M of the bits in each modulation symbol unit to be mapped is M=2, and the bits in the modulation symbol unit to be mapped are flipped according to the following formula:

$D_i(j)=j \bmod M$;

in the case that the modulation method for the bit sequence to be mapped is a 16QAM, the number M of the bits in each modulation symbol unit to be mapped is M=4, and the bits in the modulation symbol unit to be mapped are flipped according to the following formula:

$D_i(j)=((2r_0+1)j+(2r_1+1)) \bmod M$; and in the case that the modulation method for the bit sequence to be mapped is a 64QAM, the number M of the bits in each modulation symbol unit to be mapped is M=6, and the bits in the modulation symbol unit to be mapped are flipped according to the following formula:

$D_i(j)=((3r_2-1)j+(3r_3-1)) \bmod M$;

wherein $D_1(j)$ is a bit index in the modulation unit to be mapped, M is a modulation order, $r_0, r_1, r_2, r_3$ are arbitrary integers, i is an index of the modulation symbol unit to be mapped, and j is a bit index in the modulation symbol unit to be mapped.

6. The method according to claim 5, wherein as for the QPSK modulation method, the 16QAM modulation method, and the 64QAM modulation method, the flipping is performed through one of the following formulae:

$$D_i(j) = (-1)^{CRV_i} \cdot j - CRV_i;$$

$$D_i(j) = \frac{M}{2} + (-1)^{CRV_i} \cdot j - CRV_i;$$

$$D_i(j) = \left(\frac{M}{2} - 1\right)^{CRV_i} \cdot j - CRV_i; \text{ and}$$

$$D_i(j) = \left(\frac{M}{2} - 1\right)^{CRV_i} \cdot j + \left(\frac{M}{2} - 1\right) \cdot CRV_i;$$

wherein $CRV_i$ is a re-arrangement version of the $i^{th}$ modulation symbol unit to be mapped.

* * * * *